March 17, 1970  T. O. PAINE  3,500,827
ACTING ADMINISTRATOR OF THE NATIONAL
AERONAUTICS AND SPACE ADMINISTRATION
PORTABLE ENVIRONMENTAL CONTROL SYSTEM
Filed Jan. 16, 1969  3 Sheets-Sheet 1
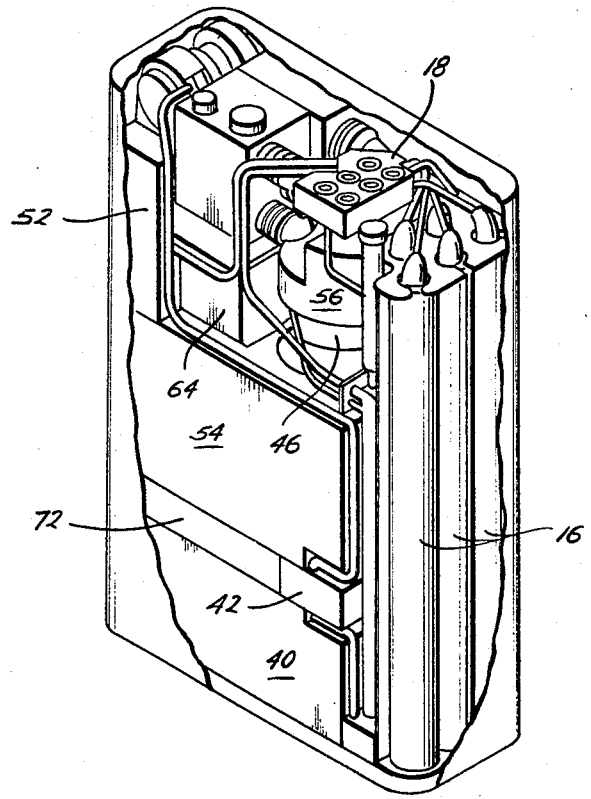
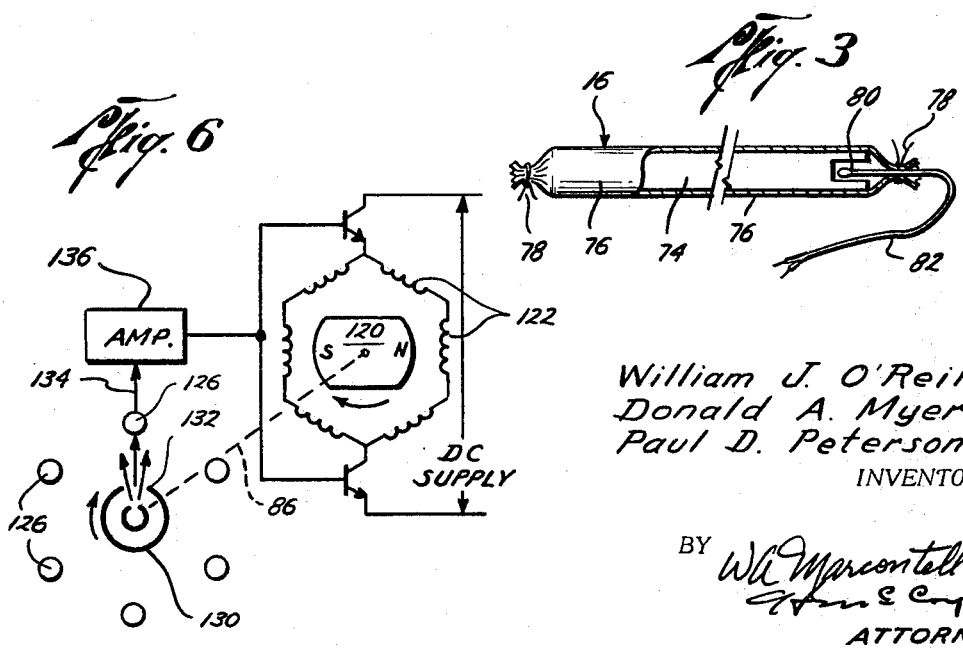
William J. O'Reilly
Donald A. Myers
Paul D. Peterson
INVENTORS
BY
ATTORNEYS

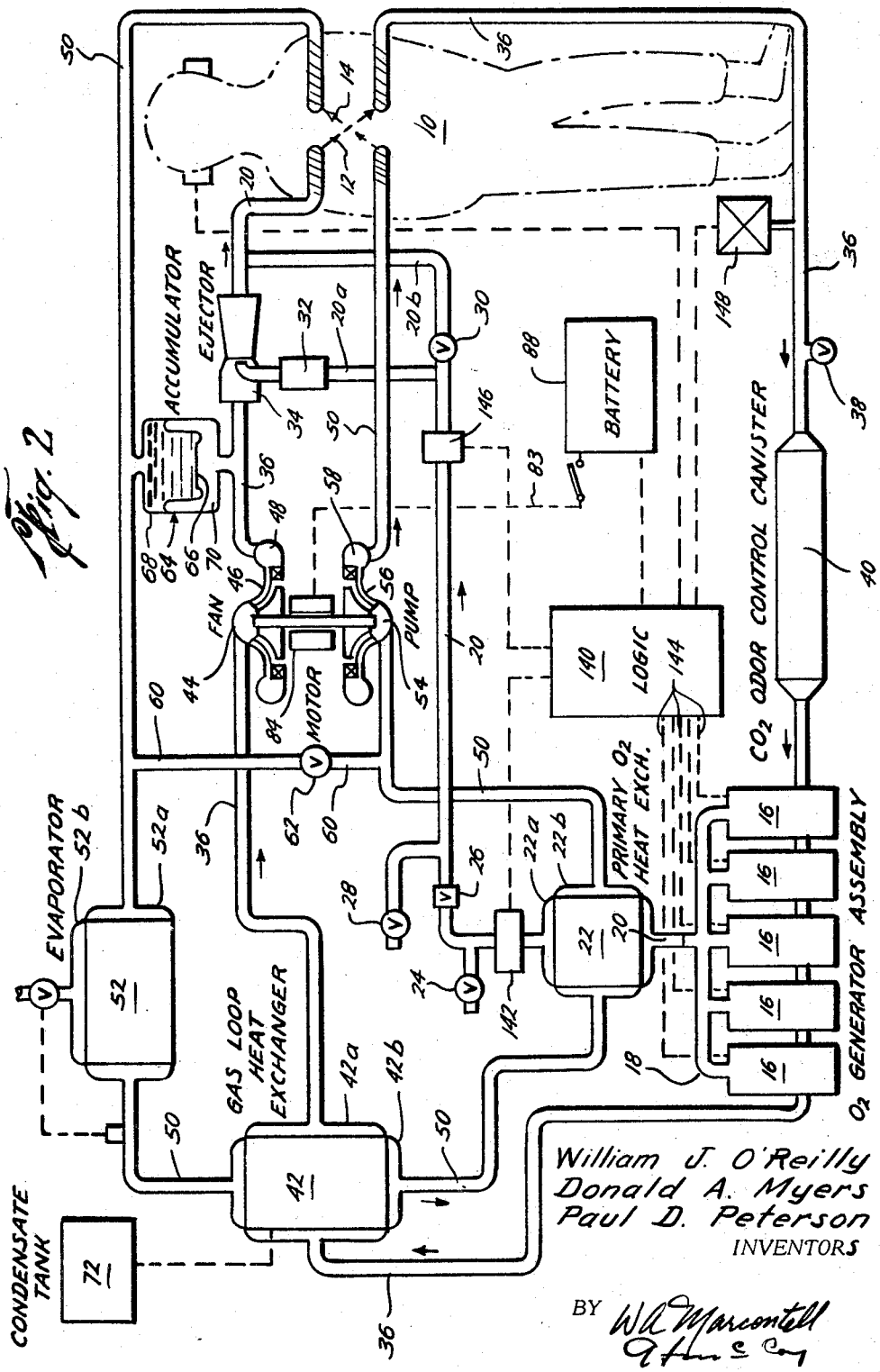

William J. O'Reilly
Donald A. Myers
Paul D. Peterson
INVENTORS

United States Patent Office 3,500,827
Patented Mar. 17, 1970

3,500,827
PORTABLE ENVIRONMENTAL CONTROL
SYSTEM
T. O. Paine, Acting Administrator of the National Aeronautics and Space Administration, with respect to an invention of William J. O'Reilly, Los Angeles, Calif., Donald A. Myers, Lakewood, Colo., and Paul D. Peterson, Los Angeles, Calif.
Filed Jan. 16, 1969, Ser. No. 791,693
Int. Cl. A62b 7/02; A61m 15/00; F24f 7/06
U.S. Cl. 128—142.5                    10 Claims

ABSTRACT OF THE DISCLOSURE

A portable environmental control and life support system for a protective garment of the type having an inner plenum chamber and an outer liquid chamber. A breathable fluid flow system communicates with and provides oxygen for purposes of supporting life within the plenum chamber and for pressuring said chamber. Means are provided for withdrawing the exhaust oxygen stream from the plenum chamber, removing carbon dioxide and odor, cooling the stream and recirculating it back to the plenum chamber. A cooling liquid system in heat exchange relation with the oxygen system communicates with the liquid chamber of the garment for purposes of circulating a cooling liquid therethrough. The liquid is withdrawn from such chamber, cooled by evaporative means and is passed in heat exchange relation with the oxygen stream to cool the oxygen stream where upon the liquid is again returned to the liquid chamber of the protective garment. Circulation of both the oxygen and cooling liquid systems is mechanically induced by a single motor driving a compressor and a pump wherein the motor is directly coupled to the compressor and coupled to the pump by means of a magnetic gear reducer and a magnetic clutch.

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

BACKGROUND OF THE INVENTION

Life sustenance in flight in a space mission and/or in extra-vehicular activity during such a space mission involves numerous considerations that are compounded when the life support system is made portable. For example, such a system should be capable of providing life support for several hours. The system should have minimum volume in order to reduce weight and to facilitate emergence from a spacecraft during any extra-vehicular activity. The use of expendables within the system preferably should be maintained at a minimum with the capability of resupplying any such expendables during flight to provide for multimission activity.

Heretofore, life support systems that have been proposed or actually employed have relied on life support of a crewman through the use of, for example, an umbilical connector between the crewman and the spacecraft to supply the crewman with oxygen or cooling means or both. Still other systems have involved the use of highly compressed or even liquified breathing fluids and/or cooling fluids which are bulky and not suitable for being resupplied during spacecraft flight. Thus it would be highly advantageous to provide a portable life support system wherein expendables are minimized and are capable of expedient resupply yet provide maximum required metabolic load capacity and at the same time the system is packaged with minimum volume requirements and with ease of access for resupply of the expendables.

SUMMARY OF THE INVENTION

The present invention provides a portable environmental control system uniquely adapted for use by a crewman in extra-vehicular activity as well as within a spacecraft during a space flight mission. The system generally includes a breathable fluid circuit for pressurizing and supplying oxygen to a crewman's protective garment and a liquid circuit for circulating and supplying a cooling liquid such as water to the protective garment. The breathable fluid and liquid circuits are heat exchange and pressure interrelated and circulation of both systems is mechanically induced by a single power system. As a result, volume and power requirements are greatly reduced in relation to prior art systems and metabolic load capabilities are substantially increased.

It is, therefore, an object of the present invention to provide a portable environmental control and life support system for an enclosure such as a protective garment wherein a breathable fluid as well as a cooling liquid are supplied and maintained in circulation therein by a single power means and are heat and pressure interrelated so as to increase the metabolic capability of the system.

A further object of the present invention is the provision of such a control and life support system wherein the breathing fluid is generated at a controlled rate by decomposing solid substances such as sodium chlorate candles to evolve oxygen, cooling the evolved oxygen, and passing it to the crewman followed by regeneration to remove carbon dioxide and odor for reuse.

Still a further object of the present invention is the provision of such a system wherein the liquid circuit for cooling the crewman's protective garment removes waste metabolic heat and at the same time cools the breathable fluid thereby increasing the metabolic load capabilities of the system.

Yet a further object of the present invention is the provision of evaporative means for cooling the liquid circuit by boiling water through such means at reduced pressure and temperature so as to make advantageous use of the reduced pressure encountered in a space environment.

Still a further object of the present invention is the provision of a single power means for maintaining circulation of both the breathable fluid and liquid circuits through the provision of a brushless, photoelectrically commutated motor with magnetic gearing and coupling to increase efficiency of the power transmitted so as to reduce power requirements and size of the system.

Other and further objects, features and advantages will be apparent from the following description of presently preferred embodiments of the invention, given for the purpose of disclosure and taken in conjunction with the accompanying drawings.

DESCRIPTION OF THE DRAWINGS

In the drawings forming a part of the disclosure herein, like character references designate like parts throughout the several views wherein, FIGURE 1 is a perspective view of the packaged control system of the present invention, FIGURE 2 is a schematic diagram of such system shown in operative relation with a crewman's protective garment, FIGURE 3 is a partial cross-sectional view of the breathable fluid source, FIGURE 6 is a partial schematic and partial circuit diagram of the motor of FIGURE 5.

DESCRIPTION OF THE PREFERRED EMBODIMENT

Figure 4:
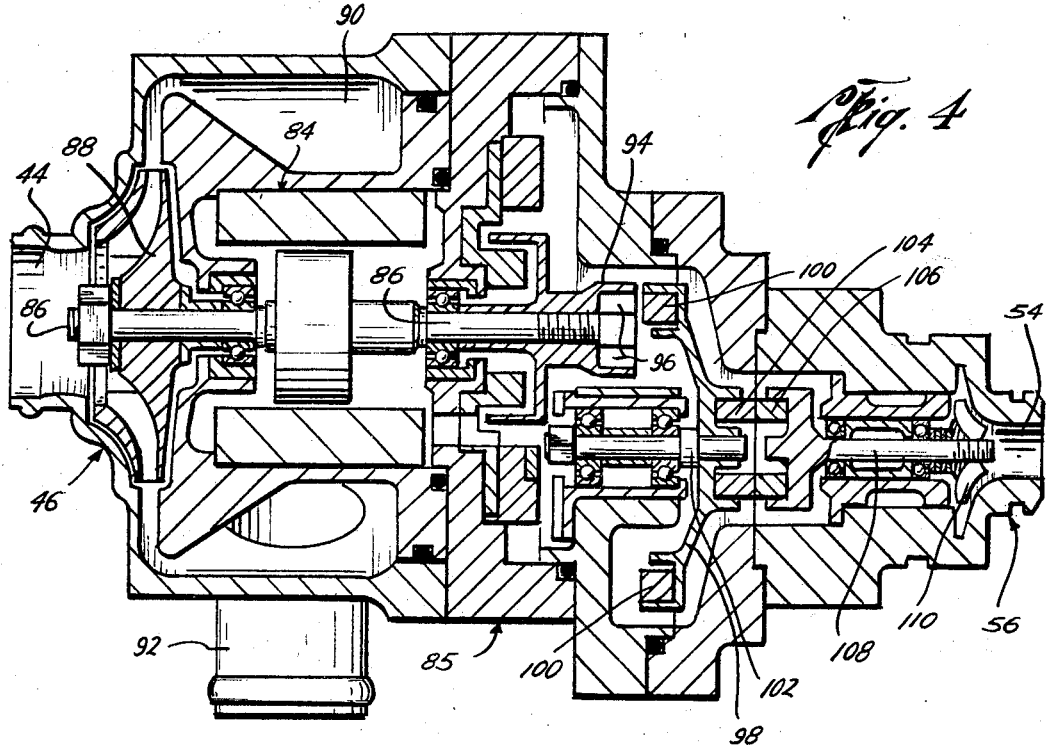
FIGURE 4 is a cross-sectional elevational view of the motor, compressor, pump, magnetic gearing and magnetic coupling means for circulating the breathable fluid and cooling liquid.

With reference generally to FIGURE 1 for structural and packaging relationships and more particularly to FIGURE 2 for functional and operational relationships, the present invention will be described with respect to adaptation for support of a crewman of a spacecraft. The term "spacecraft" is intended to have its usual meaning, i.e. a vehicle normally in flight outside of the environment immediately adjacent the earth's surface whether such flight be orbital, lunar, or interplanetary. Additionally, the term "flight" may include "extra-vehicular" activity or operation by a crewman outside of the spacecraft.

The reference numeral 10 generally connotes a crewman's protective garment or related enclosure of the type having an inner plenum chamber and an outer liquid chamber. Such garment is well known to those skilled in the art and alone does not form a part of the present invention nor is further description thereof necessary. The portable system of the present invention for controlling conditions within the suit or garment 10 includes a breathable fluid flow system passing through the garment as indicated by the broken line 12 and a cooling liquid system as indicated by the broken line 14. The breathable fluid flow system 12 serves to pressurize the garment 10 and at the same time provide oxygen to sustain life with the plenum chamber of the garment, while the cooling liquid system 14 communicates with the outer liquid chamber of the garment to remove waste body or metabolic heat of the crewman within the suit.

With regard first to the breathable fluid flow system 12, breathable fluid for such system is provided by the evolution of oxygen from sodium chlorate candles 16 which will be described in more detail hereafter. The oxygen evolved from the candles 16 is drawn through a header 18 for passage into the conduit 20. Preferably a suitable filter such as a charcoal filter is provided in the conduit 20 immediately adjacent the header 18 to remove any solid particles suspended in the oxygen and to trap other impurities that conceivably could contaminate the oxygen stream. Within the conduit 20 is a two-pass heat exchanger 22, the conduit 20 communicating with the first pass 22a of the exchanger for cooling the oxygen by means of a cooling liquid passing through the second pass 22b. Also within the conduit 20 or operatively associated therewith are a suitable pressure relief valve 24 to vent abnormally high pressure from the conduit, a suitable check valve 26 to maintain oxygen flow in the direction of the arrows within the conduit as shown in FIGURE 2, and a suitable valve and connector assembly 28 to permit communication with a umbilical line should an external source of oxygen ever be required.

Immerdiately before communicable connection with the suit or garment 10, flow within the conduit 20 is preferably split so that the oxygen may pass through the conduit 20a and/or 20b. Flow through the conduit 20b is regulated by valve 30 which in turn will govern the amount of flow through the conduit 20a. As an added safety feature, another suitable filter such as charcoal filter 32 is provided to assist in removal of impurities from the oxygen stream prior to the oxygen being drawn into the suction side of an ejector 34 for passage to the garment 10.

Once the oxygen or other breathable fluid circulates through the plenum chamber of the garment 10, the exhaust oxygen stream is withdrawn from the plenum chamber by means of the conduit 36 which is preferably provided with a suitable pressure relief valve 38. Within the conduit 36 is a canister 40 through which the exhaust oxygen stream passes for removal of carbon dioxide ($CO_2$) and odor. The canister 40 contains suitable absorption material such as lithium hydroxide for removal of the $CO_2$ and charcoal for odor control. It will be recognized, of course, that other absorption materials may be employed.

Downstream of the canister 40, the conduit 36 operatively connects for fluid communication with a two-pass heat exchanger 42 for removal of heat from the exhaust oxygen stream. Thus the conduit 36 communicates with the first pass 42a of the exchanger which is in heat exchange relation with the second pass 42b in which is circulated a cooling liquid as will be described hereafter.

Downstream of the exchanger 42, the conduit 36 connects with the suction side 44 of a fan or compressor 46 in order to increase the pressure of the oxygen within the conduit prior to being recirculated to the garment 10. Thus the oxygen stream is discharged from the pressure side 48 of the compressor and continues through the conduit 36 for passage to the motive pressure side of the ejector 34. The ejector discharges into the conduit 20 and thus causes the freshly generated oxygen within the conduit 20a to be entrained in the exhaust (but reclaimed) oxygen stream within the conduit 36 whereupon the combined streams are passed back into the plenum chamber of the garment 10. Thus continual circulation of the oxygen or breathable fluid is maintained within the system as described and at the same time make-up oxygen from the candles 16 is continually added to maintain the requisite amount of oxygen for breathing by the crewman within the protective garment 10.

The cooling liquid (such as water) system 14 circulating through the outer liquid chamber of the garment 10 serves to remove the waste body heat from the crewman inside the garment as well as heat leaking through the suit, heat entering the system from the associated equipment, and the heat removed from the breathable fluid circuit as will become apparent. The outer liquid chamber of the garment 10 connects with the conduit 50 for removal of the cooling liquid from the garment once the liquid has performed its function of absorbing heat therein.

The conduit 50 communicates with an evaporator 52, such evaporator preferably being of a suitable wick-fed type. As shown in FIGURE 2, the conduit 50 passes through, for example, the first pass 52a of the evaporator while water boiling at reduced pressure and reduced temperature passes through the second pass 52b of such evaporator. The wick-fed evaporator may be of a plate and fin construction and the temperature within the conduit 50 and first pass 52a is controlled by regulating the water feed and evaporant pressure control within the second pass 52b of the evaporator as will be understood by those skilled in the art. A suitable reservoir 54 (FIG. 1) connects with the second pass 52b of the evaporator to supply water for evaporative purposes.

Downstream of the evaporator 52, the conduit 50 communicates with the second pass 42b of the heat exchanger 42 for heat exchange with the oxygen stream within the conduit 36 and consequent cooling of such oxygen stream. The conduit then connects with the second pass 22b of the heat exchanger 22 for heat exchange with the oxygen within the conduit 20 thereby cooling such oxygen prior to transmittal of the oxygen to the plenum chamber. Downstream of the heat exchanger 22, the conduit 50 communicably connects with the suction 54 of the centrifugal pump 56 so that the liquid is pressurized and discharged from the discharge 58 of the pump for recirculation through the conduit 50 back to the inlet of the outer liquid chamber of the protective garment 10.

Ahead of the evaporator 52 the conduit 50 connects with a by-pass line 60 having a suitable control valve 62 to regulate flow of liquid through the line 60. The by-pass line 60 again connects with the conduit 50 ahead of the pump 56 and the control valve 62 may act as a mixing valve to allow some of the liquid flow to be diverted around the evaporator 52 in order to regulate the inlet water temperature of the garment 10 to the most comfortable condition. In other words, opening of the valve 62 will divert flow around the evaporator 52 thereby raising the temperature of the liquid within the suit 10 while closing of the valve 62 will lower the temperature of the liquid within the suit 10.

Provided between the liquid and breathing fluid circuits is an accumulator 64 having two chambers separated by a flexible membrane 66. The first chamber 68 is filled with cooling liquid and communicates with the conduit 50 while the second chamber 70 communicates with the conduit 36. As a result, pressure of the oxygen or breathable fluid within the conduit 36 is exerted against the flexible membrane 66 which in turn exerts pressure against the liquid within the chamber 68 thereby tending to force such liquid into the conduit 50. Pressure of the gas within the conduit 36 continually tends to force cooling liquid into the conduit 50 to provide for any liquid losses from the cooling system.

The exhaust oxygen stream in the conduit 36 naturally contains a small amount of moisture picked up from within the plenum chamber as the result of exhaled breath of the crewman as well as natural perspiration from the crewman. As the exhaust oxygen stream is cooled in the heat exchanger 42, some of such moisture is condensed and is collected in a condensate tank 72. If desired, condensate within the tank 72 may be transmitted to the reservoir 54 for use in the second pass 52b of the evaporator 52.

The oxygen source means 16 as shown in FIGURES 1 and 2 comprises a plurality of sodium chlorate "candles," one of which is shown in detail in FIGURE 3. Each candle 16 comprises sodium chlorate 74 encased within a Refrasil (refractory insulation) sleeve 76, both ends of the sleeve being tied off with Refrasil string 78. A suitable electric starter 80 is inserted into the sodium chlorate material and is actuated by a power source transmitting current through the wire 82. Of course, each "candle" is stored in suitable, preferably metal, containers communicating with the header 18 as shown in FIGURE 1.

The sodium chlorate material within each candle 16 preferably consists of about 86.5% by weight sodium chlorate, about 3.5% by weight iron, about 4.0% by weight barium dioxide and about 6.0% by weight glass. Upon activation by the electric starter 80, oxygen may be generated at a steady rate until the candle is exhausted, the generation rate being determined by the structural configuration of the candle and the chemical formulation of the sodium chlorate and other ingredients. The heat of decomposition of pure sodium chlorate is insufficient to sustain self-decomposition so additional heat (fuel) must be continually supplied. For this reason, a powdered metal such as reduced iron is mixed with the chlorate which, upon ignition, undergoes oxidation to produce the heat required to sustain a self-propagating reaction within each candle. Barium dioxide is also added to serve as a catalyst and, in addition, can combine with any halogen evolved to insure the purity of the final oxygen product. Glass fiber is preferably incorporated into the candle mixture for structural integrity and for a physical retention of the burning front starting at the electric starter 80.

By way of example, assuming the composition of each candle to be in the proportions as described above, a candle weighing 1.5 pounds contains 0.5 pound of oxygen and occupies a volume of only 14 cubic inches. It can be stored indefinitely at ambient pressures and at temperatures up to 400° F. The candle configuration as shown in FIGURE 3 and described will supply oxygen equivalent to a 2000 B.t.u. per hour metabolic usage rate for about 65 minutes. Thus a plurality of such candles will provide the necessary and suitable oxygen requirements for sustaining life within the protective garment 10 as desired.

Referring once again generally to FIGURES 1 and 2, the centrifugal fan or compressor 46 and the centrifugal pump 56 provide means for maintaining circulation within the breathing fluid and liquid cooling systems respectively. Power to provide the necessary torque to actuate both the compressor and pump is uniquely provided by a motor 84 which receives current through a power line 83 from a power source such as a storage battery 88.

As illustrated in detail in FIGURE 4, the motor 84, centrifugal compressor 46 and centrifugal pump 56 are preferably integrally combined in a housing 85 to minimize space requirement. The motor 84 is provided with an elongate power shaft 86 extending from either side of the motor and suitably journalled for rotation. The impeller 88 of the centrifugal compressor 46 is secured on one end of the shaft 86 so that the breathable fluid stream enters the suction 44 of the compressor, is pressurized, and is passed to the discharge chamber 90 and out of the discharge side 92 of the compressor.

On the opposite end of the shaft 86 is secured a magnet mounting member 94. A plurality of magnets 96 are secured to the mounting 94 and thus rotate upon rotation of the shaft 86. Immediately adjacent thereto is another but larger diameter magnet mounting 98 having secured thereto a plurality of magnets 100. The magnet mounting 98 is in turn secured to a shaft 102 journalled for rotation and having another set of magnets 104 forming a clutch or coupling with yet another and adjacent set of magnets 106 secured on the shaft 108. The shaft 108 likewise is journalled within the housing 85 for rotation and connects with the impeller 110 of the pump 56. Thus rotation of the shaft 108 imparts rotation to the impeller 110 so that cooling liquid entering the suction side 54 of the pump is pressurized and discharged through the discharge of the pump (not shown in FIGURE 4).

The magnets 96 together with the magnets 100 form a magnetic reduction gear combination that are analogous to conventional gears with teeth. Whereas conventional gears with teeth transmit loads from tooth to tooth by physical contact, the magnetic gear system of the present invention transfers the load by magnetic field interaction of the opposing magnetic poles with no physical contact. Thus, for example, the magnets 96 form one pole distributed about a small diameter on the shaft 86 by means of the magnet mounting 94, and the magnets 100 are distributed over a wider diameter on the magnet mounting 98 and thereby form another pole. The elimination of mechanical contact within this magnetic gear system obviates the problem of lubricating gear teeth with the associated danger of the lubricant contaminating the oxygen environment. The use of magnetic gear means as in the present invention also reduces the volume and weight requirement and contributes to power efficiency since magnetic gear drives are much more efficient in the transmission of torque as compared with gear teeth drive systems.

Similarly, the set of magnets 104 form one pole which magnetically coacts with the other pole of the magnets 106 to provide a clutch or coupling for transmission of torque from the magnetic gear means to the pump. Such clutch or coupling is effective to prevent failure of the compressor 46 should the pump 56 seize due to bearing failure or ingestion of foreign material into the pump since any such failure will cause torque on the magnetic coupling to increase until the magnets 104 will separate from the magnets 106 thereby reducing torque on the pump side of the motor to a point approaching zero. Thus the failure in the liquid pump 56 will not cause the motor 84 and gas compressor 46 to stop.

Figure 5:
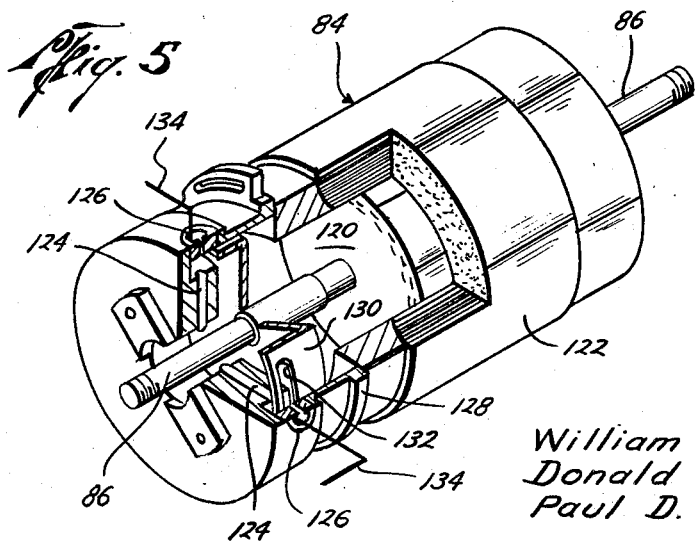
FIGURE 5 is a perspective view, partially cut away, of the motor shown in FIGURE 4.

With reference now to FIGURE 5, the motor 84 is shown in cut-away detail, such detail not being completely illustrated in FIGURE 4. A circuit diagram of the motor and schematic of the relative parts thereof is shown in FIGURE 6 and reference is now made to both figures. The motor 84 is preferably of the brushless direct current type, being photoelectrically commutated to eliminate conventional direct current motor brush problems. The function of the conventional brush commutator is provided in the present invention by a solid-state electronic switching system that eliminates sliding contact brushes and the accompanying friction, arcing and wear. As a result, the motor has a longer life, virtually no radio-frequency interference and a high efficiency-to-weight ratio.

In the brushless direct current motor, the rotor 120 is a permanent magnetic field and the stator 122 is somewhat similar to a conventional armature winding without a mechanical commutator. A series of matched, solid-state light emitters 124 and detectors 126 are mounted within the housing 128 of the motor. A cup or shield 130, which is rigidly attached to the shaft 86, rotates between the light emitters 124 and detectors 126. Holes 132 in the shield 130 allow specific detectors 126 to be energized when the rotor field is aligned with a specific stator coil. As a result, a specific detector emits a signal through the circuit 134 which actuates a power amplifier 136 which in turn excites or actuates a specific stator coil 122. Thus as the shield 130 rotates with the rotor 120, a hole 132 in the shield permits another detector 126 to be actuated by means of each light source 124 to in turn actuate another stator winding 122 thereby imparting torque to the shaft 86.

In operation and with reference once again to FIGURE 2, oxygen is supplied to the plenum chamber of the protective garment 10 by the breathable fluid system 12 communicating therewith. Such oxygen is evolved by the candle means 16 after being cooled in the heat exchanger 22 and transmitted to the plenum chamber through the conduit 20. Exhaust from the plenum chamber is carried through the conduit 36 to the canister 40 wherein lithium hydroxide within the canister removes carbon dioxide and charcoal therein removes odor and other impurities. From the canister 40, the exhaust oxygen stream passes through the conduit 36 into the heat exchanger 42 wherein the oxygen is cooled and is recirculated back to the plenum chamber by means of the centrifugal compressor 46. The discharge side of the centrifugal compressor 46 connects with the ejector 34 to supply motive pressure to the ejector for purposes of assisting in pumping of freshly evolved oxygen from the conduits 20 and 20a into the plenum chamber.

The outer liquid chamber of the protective garment 10 receives a cooling liquid through the cooling liquid circuit 14 for purposes of removing heat from the protective garment. From the garment, the heated liquid passes through the conduit 50 to which make-up water is provided from the accumulator 64. The cooling liquid or water is then cooled by the evaporator 52 and passes to the heat exchanger 42 to cool the breathing fluid stream and thence to the heat exchanger 22 to cool the freshly evolved oxygen. The pump 56 then draws the cooling liquid, pressurizes it, and recirculates it back to the outer liquid chamber of the protective garment. As indicated previously, temperature of the cooling liquid may be regulated easily by operation of the valve 62 such that the liquid is heated by opening the valve 62 to bypass the evaporator 52 or cooled by closing the valve 62.

The motor 84 such as shown in FIGURE 5 receives current through the transmission circuit 83 from a battery 88 and imparts torque to the shaft 86 as shown in FIGURE 4. Torque is transmitted directly to the compressor 46 so as to operate the compressor at high speed thereby imparting sufficient pressure to the breathable fluid stream in conduit 20 to pressurize the protective garment 10 and to provide adequate circulation within the plenum chamber of the garment.

Again with reference to FIGURE 4, the centrifugal pump 56 need not operate at such a high speed so it is geared down to, for example, a 4:1 ratio by means of the magnetic gear reduction through the magnets 96 and magnets 100. Thus torque is transmitted to the pump shaft 108 through the magnetic coupling comprised of the magnets 104 and 106.

Appropriate controls may be provided such as by means of a logic center represented by the reference 140 in FIGURE 2. The logic system 140 may sense the rate of freshly generated oxygen by means of a sensor 142 so as to control ignition of and evolution of oxygen from the candles 16 through appropriate circuits 144. If oxygen is supplied to the protective garment 10 by means of the umbilical connector 28, again the oxygen content and pressure may be sensed by means of a flow sensor 146 within the conduit 20. Pressure of the oxygen within the plenum chamber of the garment 10 may be sensed and regulated by means of a suitable switch 148 within the conduit 36 which likewise communicates by signal with the control logic 140. It will be understood by those skilled in the art that the control logic 140 may likewise control the motor 84 to in turn control the circulation of the breathing fluid and cooling liquid circuits. Appropriate manual controls to operate the logic 140 may be provided as will become apparent to those skilled in the art.

Thus the present invention provides a unique portable system for controlling environment and life support of for example, the protective garment of a crewman during space flight. The invention uniquely combines the breathable fluid and liquid cooling circuits in heat exchange relation as well as pressure relation resulting in greatly reduced overall package size, reduction of power requirements by circulating both systems through a single motor means, and increasing the metabolic load capabilities by transferring heat from the breathable fluid system to the cooling liquid system with efficiency.

The present invention, therefore, is well adapted to carry out the objects and attain the ends and advantages mentioned as well as those inherent therein. While presently preferred embodiments of the invention are given for the purpose of disclosure, numerous changes in the details of construction and arrangement of parts can be made which will readily suggest themselves to those skilled in the art and which are encompassed within the spirit of the invention and in the scope of the appended claims.

What is claimed is:

1. A portable environmental control system for an enclosure, comprising
   a breathable fluid flow system, said system including,
      a breathable fluid source means communicating with the enclosure,
      a first conduit communicating with the enclosure for withdrawing exhausted breathing fluid therefrom,
      carbon dioxide and odor removal means within said first conduit for coaction with the exhausted breathing fluid,
      a two-pass heat exchanger the first pass of which operatively connects with said first conduit for controlling temperature of the breathing fluid, and
      means communicably associated with said first conduit and enclosure for transferring said breathing fluid within the first conduit back to the enclosure; and
   a cooling liquid system in heat exchange coaction with the breathable fluid flow system, said cooling liquid system including,
      a second conduit communicating with the enclosure and having a cooling liquid therein, said conduit providing means for conducting the liquid to and from the enclosure,
      means within the second conduit for cooling the liquid,
      the second conduit operatively connecting with the second pass of the two-pass heat exchanger of the breathable fluid flow system for heat exchange with the first pass thereof, and
means within the second conduit for circulating the liquid through the conduit to and from the enclosure.

2. The invention of claim 1 wherein the breathable fluid source means communicating with the enclosure comprises,
sodium chlorate candle means for evolving elemental oxygen upon decomposition thereof,
means for conducting evolved oxygen to the enclosure.

3. The invention of claim 2 including means for cooling the evolved oxygen prior to its being conducted to the enclosure.

4. The invention of claim 2 wherein the means for conducting evolved oxygen to the enclosure includes,
a third conduit for communication between the sodium chlorate candle means and the enclosure, and
ejector means within the third conduit for imparting pressure to the evolved oxygen.

5. A portable environmental control and life support system for a protective garment of the type having an inner plenum chamber and an outer liquid chamber, including
a breathable fluid flow system, said system including sodium chlorate candle means for evolving elemental oxygen upon decomposition thereof,
a first conduit for conducting evolved oxygen from the candle means to the plenum chamber,
a first two-pass heat exchanger the first pass of which operatively connects with said first conduit for cooling the evolved oxygen therein,
a second conduit communicating with the plenum chamber for withdrawing the exhaust oxygen stream therefrom,
carbon dioxide and odor removal means within the second conduit for coaction with the exhaust oxygen stream,
a second two-pass heat exchanger the first pass of which operatively connects with the second conduit for controlling temperature of the exhaust oxygen stream, and
blower means communicably associated with said second conduit for pressuring and transferring the exhaust oxygen stream back to the plenum chamber; and
a cooling liquid system in heat exchange coaction with the breathable fluid flow system, including
a third conduit communicating with the liquid chamber of the protective garment and having a cooling liquid therein, said third conduit providing means for conducting the liquid to and from the liquid chamber of the garment,
evaporative means within the third conduit for cooling the liquid,
the third conduit operatively connecting with the second passes of the first and second heat exchangers for heat exchange with the first passes thereof, and
means within the third conduit for circulating the liquid through the conduit to and from the liquid chamber of the prospective garment.

6. The invention of claim 5 wherein the evaporative means within the third conduit for cooling the liquid comprises,
wick-fed evaporator means operatively connected with the third conduit for cooling the liquid therein by boiling water through the evaporator at reduced pressure and temperature, and
water reservoir means for supplying water to the wick-fed evaporator means.

7. The invention of claim 5 including ejector means within the first conduit for imparting pressure energy to the oxygen evolved from the candle means.

8. The invention of claim 5 wherein
the means within the third conduit for circulating the liquid through the conduit to and from the liquid chamber comprises powered centrifugal pump, and
the blower means communicably associated with the second circuit comprises a powered centrifugal compressor.

9. The invention of claim 8 wherein the pump and compressor are both powered by a brushless motor means, said means including,
a current source,
a permanent magnetic rotor means,
a plurality of stator coil means for imparting energy to the rotor means such that the rotor means is rotated when the stator coil means receives a current from the current source,
amplifier means for selectively actuating each of the stator coil mean, and
photoelectric commutation means coacting with the rotor means for deriving a signal that communicates with and actuates the amplifier means.

10. The invention of claim 9 including,
magnetic gear means for transmitting torque from the brushless motor means to a magnetic clutch means, and
magnetic clutch means for transmitting torque from the magnetic gear means to the pump.

References Cited

UNITED STATES PATENTS

| | | | |
|---|---|---|---|
| 2,693,088 | 11/1954 | Green | 2—2.1 XR |
| 3,117,426 | 1/1964 | Fischer et al. | 62—223 |
| 3,161,192 | 12/1964 | McCormack | 2—2.1 XR |
| 3,174,300 | 3/1965 | Webb | 62—259 |
| 3,190,287 | 6/1965 | Miller | 128—142.5 |
| 3,212,286 | 10/1965 | Curtis | 62—259 |
| 3,227,208 | 1/1966 | Potter et al. | 62—259 XR |
| 3,279,201 | 10/1966 | Worte et al. | 62—259 XR |
| 3,343,536 | 9/1967 | Brisson et al. | 128—142.5 |
| 3,345,641 | 10/1967 | Jennings | 128—142.5 XR |

RICHARD A. GAUDET, Primary Examiner

KYLE L. HOWELL, Assistant Examiner

U.S. Cl. X.R.

62—259; 98—1.5; 128—191; 165—59